United States Patent
Szor

(10) Patent No.: US 7,334,262 B2
(45) Date of Patent: Feb. 19, 2008

(54) PROACTIVE PREVENTION OF POLYMORPHIC SMTP WORMS

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 825 days.

(21) Appl. No.: 10/763,731

(22) Filed: Jan. 22, 2004

(65) Prior Publication Data
US 2005/0166268 A1  Jul. 28, 2005

(51) Int. Cl.
H04L 9/00  (2006.01)

(52) U.S. Cl. .......................... 726/22; 726/23; 726/24; 726/26; 713/165; 713/167; 713/188

(58) Field of Classification Search .................... None
See application file for complete search history.

(56) References Cited

U.S. PATENT DOCUMENTS

| | | | |
|---|---|---|---|
| 5,889,943 A * | 3/1999 | Ji et al. ........................ | 726/22 |
| 6,088,803 A | 7/2000 | Tso et al. .................... | 713/201 |
| 6,981,279 B1 * | 12/2005 | Arnold et al. ............... | 726/22 |
| 2001/0005889 A1 * | 6/2001 | Albrecht ..................... | 713/201 |
| 2002/0129277 A1 * | 9/2002 | Caccavale .................. | 713/201 |
| 2003/0023864 A1 * | 1/2003 | Muttik et al. ............... | 713/200 |
| 2004/0015726 A1 | 1/2004 | Szor ........................... | 713/201 |

OTHER PUBLICATIONS

Sidiroglou, S., et al,'An Email Worm Vaccine Architecture', 2005, Dept. of Computer Science, Columbia University, entire document, http://www1.cs.columbia.edu/~angelos/Papers/2005/email-worm.pdf.*

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology With Striker32", Oct. 1, 1999, 2 pages. [online]. Retrieved on Nov. 11, 2003. Retrieved from the Internet: <URL:http://www.Symantec.com/press/1999/n991001.html>. Author unknown.

Parkhouse, Jane, "Pelican SafeTNet 2.0", Jun. 2000, 4 pages. [online]. Retrieved on Dec. 1, 2003. Retrieved from the Internet: <URL:http://www.scmagazine.com/scmagazine/standalone/pelican/sc_pelican.html>.

* cited by examiner

Primary Examiner—Nasser Moazzami
Assistant Examiner—Ronald Baum
(74) Attorney, Agent, or Firm—Gunnison, McKay & Hodgson, L.L.P.; Serge J. Hodgson

(57) ABSTRACT

A method includes establishing a SMTP proxy, defining an application that forms a connection with the SMTP proxy as a SMTP client application, emulating the SMTP client application including generating at least one SMTP client application dirty page, intercepting an executable application sent from the SMTP client application with the SMTP proxy, emulating the executable application including generating at least one executable application dirty page. If a determination is made that the at least one SMTP client application dirty page is a match of the at least one executable application dirty page, a determination is made that the SMTP client application is polymorphic malicious code that is attempting to send itself and protective action is taken.

22 Claims, 5 Drawing Sheets

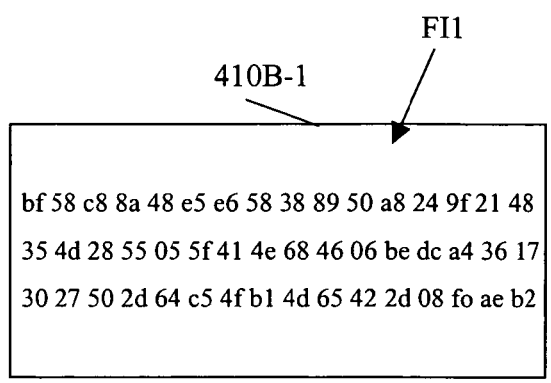
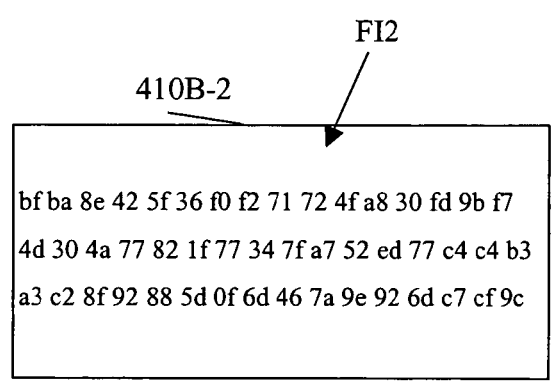
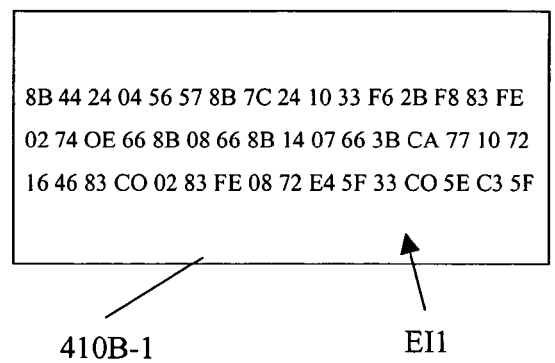
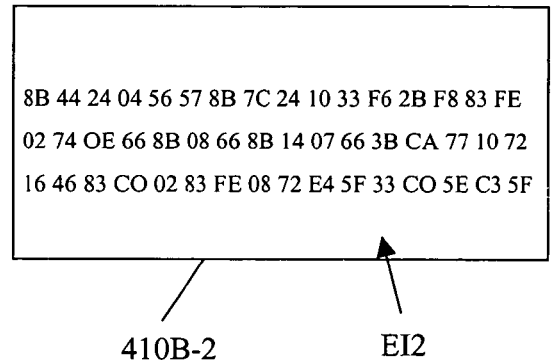
FIG. 5    FIG. 6

PROACTIVE PREVENTION OF POLYMORPHIC SMTP WORMS

BACKGROUND OF THE INVENTION

1. Field of the Invention

The present invention relates to the protection of computer systems. More particularly, the present invention relates to preventing e-mail propagation of polymorphic malicious code.

2. Description of the Related Art

Malicious code that propagates from one computer to another over a network, e.g., via e-mail, is often referred to as a "worm". Most worms that spread from one computer to another are spread via e-mail over the Internet.

The most common way to send e-mail over the Internet is using the SMTP (Simple Mail Transfer Protocol). SMTP is part of TCP/IP (Transfer Control Protocol/Internet Protocol). SMTP was originally designed to send only that e-mail that consists solely of text and that is encoded using the ASCII characters set, which is limited. It soon became apparent that computer users wished to send other than the straight ASCII characters as e-mail, and so encoding scheme such as Uuencode and MIME were developed. These encoding schemes are capable of encoding any type of file, including a binary graphics file, into ASCII so that it can be sent as an e-mail attachment.

Polymorphic malicious code such as a polymorphic SMTP mass mailing worm changes its virus signature (i.e., binary pattern) every time it replicates. By changing its virus signature, the polymorphic malicious code often avoids detection by anti-virus programs thus allowing the polymorphic malicious code to spread, e.g., as an e-mail attachment.

SUMMARY OF THE INVENTION

In accordance with one embodiment of the present invention, a method includes emulating a SMTP client application including generating at least one SMTP client application dirty page. The method further includes emulating an executable application sent from the SMTP client application including generating at least one executable application dirty page. The method further includes determining whether the at least one SMTP client application dirty page is a match of the at least one executable application dirty page. If a determination is made that the at least one SMTP client application dirty page is a match of the at least one executable application dirty page, a determination is made that the SMTP client application is polymorphic malicious code that is attempting to send itself and protective action is taken.

In accordance with one embodiment, referring now to FIG. 2, a method includes establishing a SMTP proxy in an establish SMTP proxy operation 204, defining an application that forms a connection with the SMTP proxy as a SMTP client application in a SMTP client application connects to proxy operation 206, emulating the SMTP client application in an emulate SMTP client application operation 208, determining whether dirty pages were generated during the emulation in a dirty pages generated check operation 210, and, if dirty pages were generated, saving a state of the SMTP client application including the dirty pages in a save state of SMTP client application operation 216.

In one embodiment, the method further includes establishing a SMTP proxy. In accordance with this embodiment, any application that forms a connection with the SMTP proxy is a SMTP client application, i.e., is defined as a SMTP client application. More particularly, the applications of the host computer system are not analyzed to determine if the applications are SMTP client applications, simply any application that forms a connection with the SMTP proxy is defined as and is a SMTP client application because of the application's demonstrated ability to form the connection.

Embodiments in accordance with the present invention are best understood by reference to the following detailed description when read in conjunction with the accompanying drawings.

BRIEF DESCRIPTION OF THE DRAWING

FIG. 5 is a pseudocode representation of a dirty page before and after execution of a polymorphic malicious SMTP client application in accordance with one embodiment of the present invention; and FIG. 6 is a pseudocode representation of a dirty page before and after execution of a polymorphic malicious executable application sent from the polymorphic malicious SMTP client application of FIG. 5 in accordance with one embodiment of the present invention.

Common reference numerals are used throughout the drawings and detailed description to indicate like elements.

DETAILED DESCRIPTION

Figure 2:
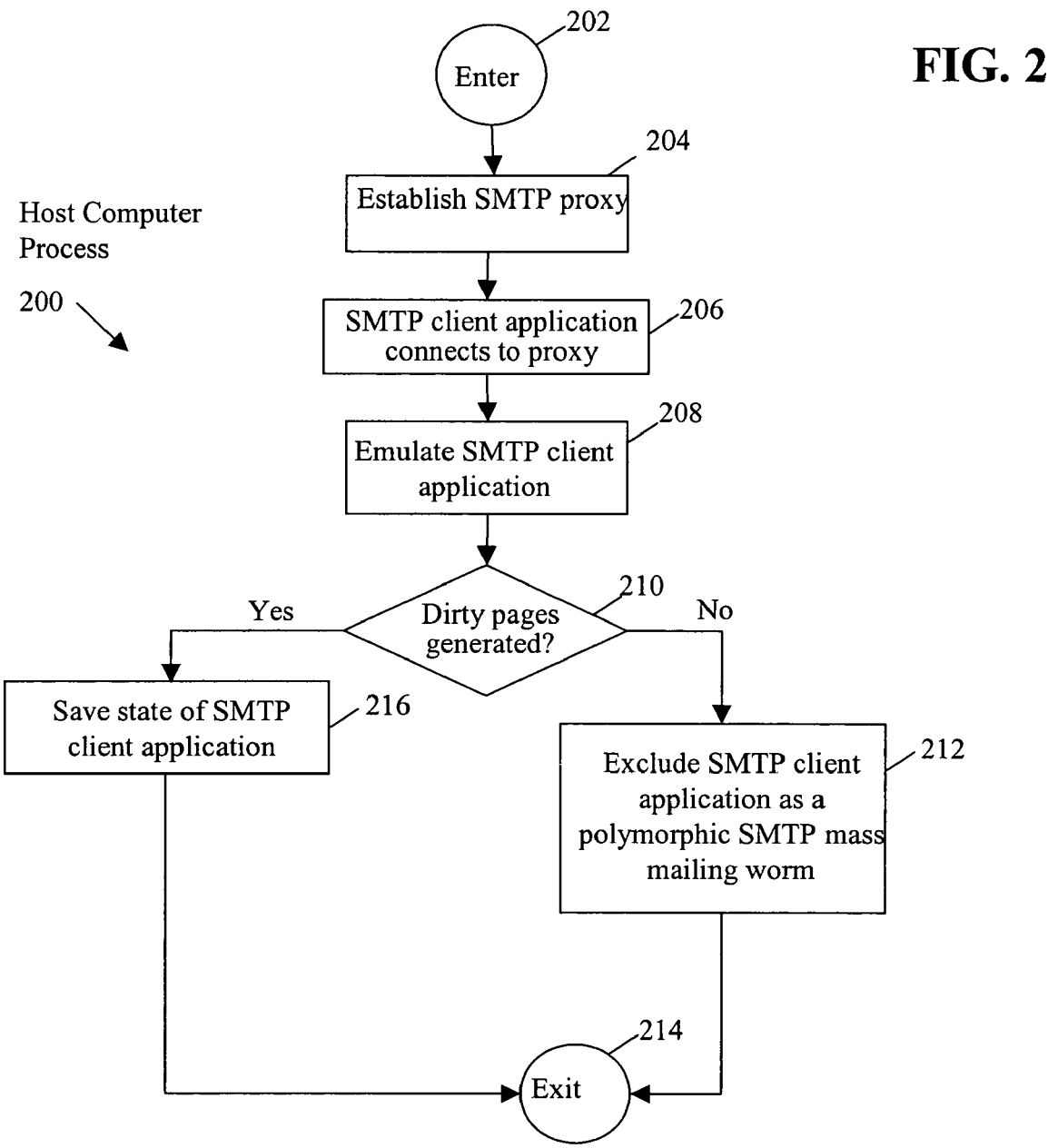
FIG. 2 is a flow diagram of a host computer process in accordance with one embodiment of the present invention.

In accordance with one embodiment, referring now to FIG. 2, a method includes establishing a SMTP proxy in an establish SMTP proxy operation 204, defining an application that forms a connection with the SMTP proxy as a SMTP client application in a SMTP client application connects to proxy operation 206, emulating the SMTP client application in an emulate SMTP client application operation 208, determining whether dirty pages were generated during the emulation in a dirty pages generated check operation 210, and, if dirty pages were generated, saving a state of the STMP client application including the dirty pages in a save state of STMP client application operation 216.

Figure 3:
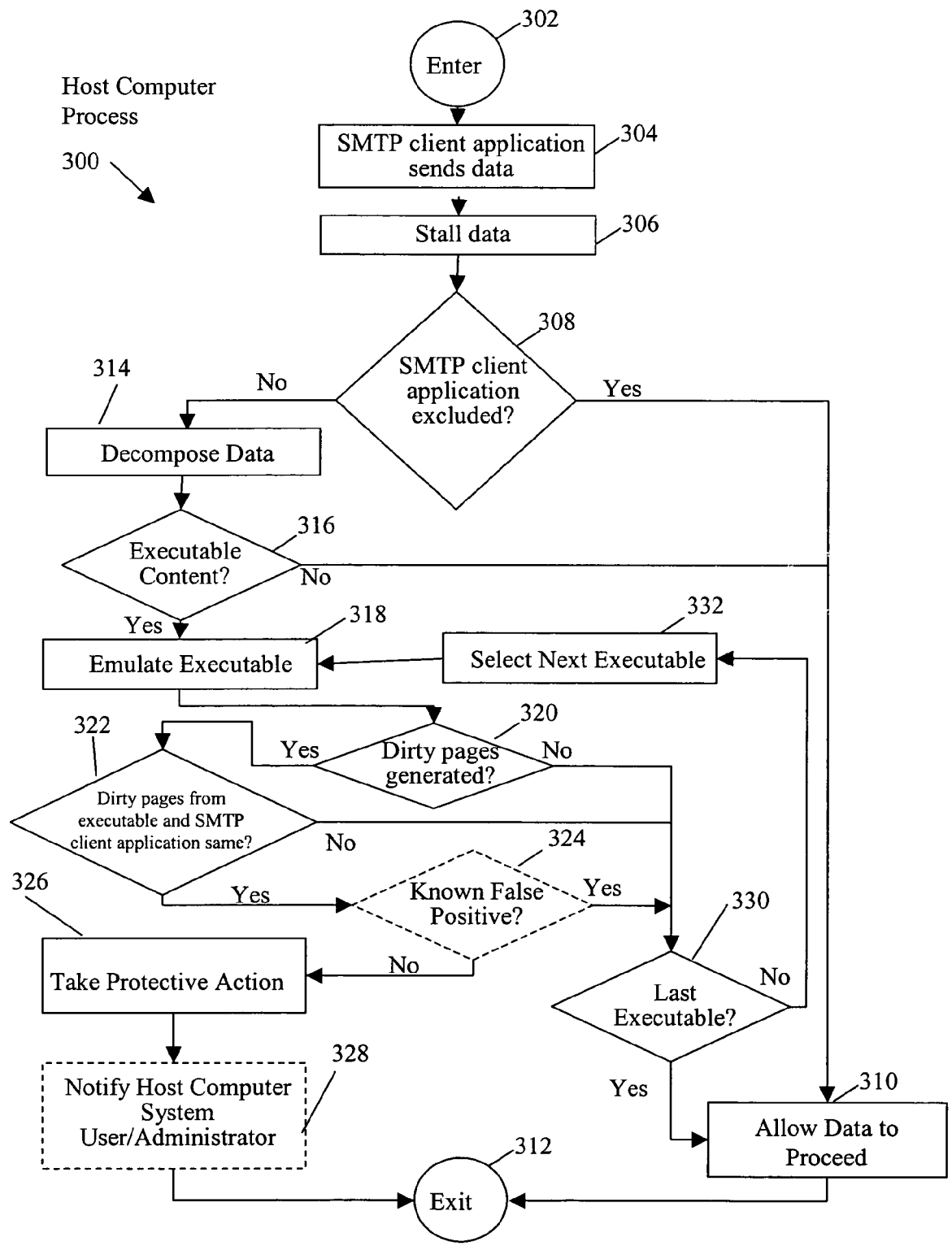
FIG. 3 is a flow diagram of a host computer process in accordance with another embodiment of the present invention.

Referring now to FIG. 3, the method further includes stalling data from the SMTP client application in a stall data operation 306, decomposing the data in a decompose data operation 314, determining whether the data includes an executable application in an executable content check operation 316, and, if the data does include an executable application, emulating the executable application in an emulate executable operation 318.

The method further includes determining whether dirty pages were generated during the emulation of the executable application in a dirty pages generated check operation 320. If dirty pages were generated, the method further includes determining whether the dirty pages from the executable application and the SMTP client application are the same in a check operation 322.

If a determination is made that dirty pages generated during the emulation of the SMTP client application are the same as the dirty pages generated during the emulation of the executable application, a determination is made that the SMTP client application is polymorphic malicious code that is attempting to send itself and protective action is taken in a take protective action operation 326.

Figure 1:
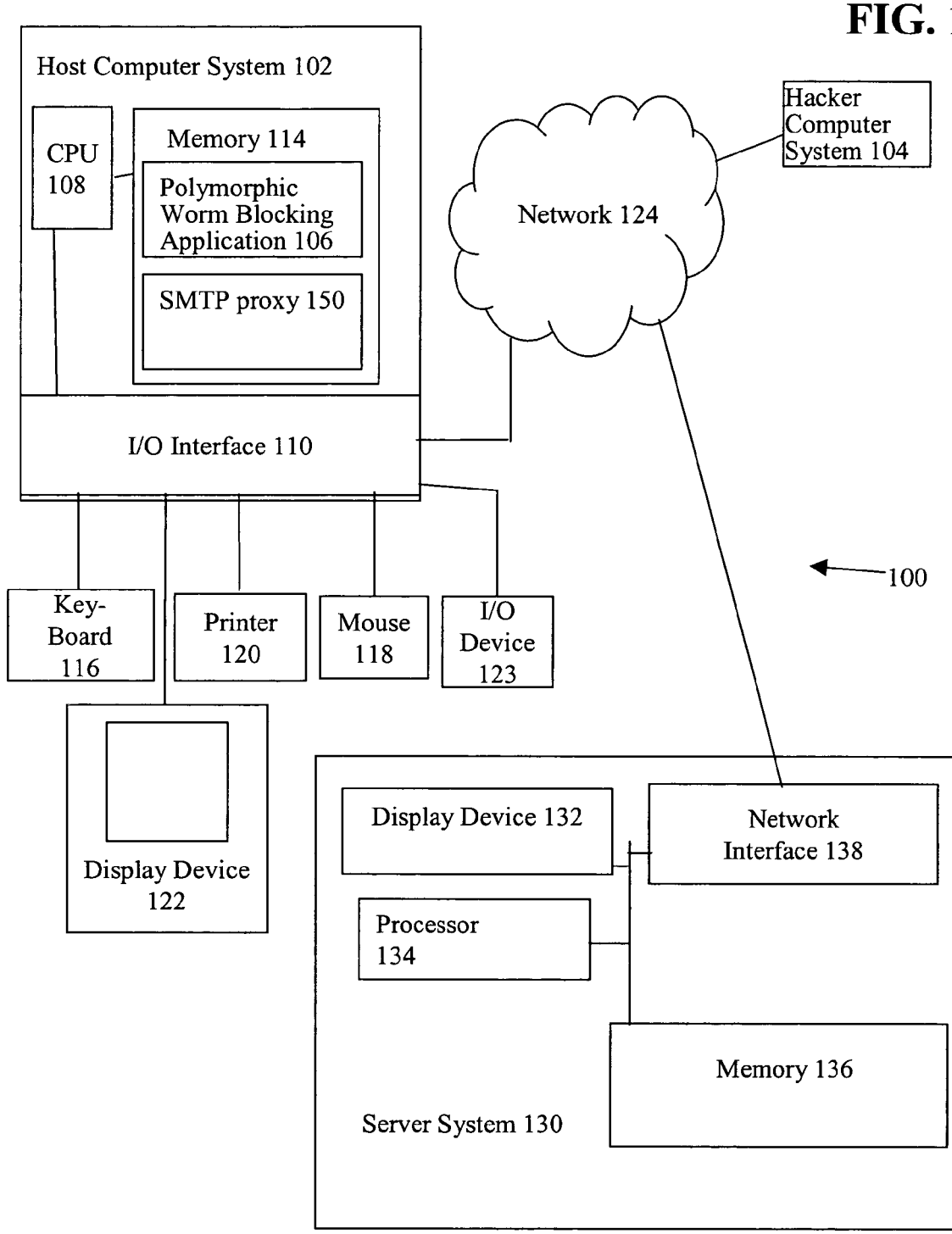
FIG. 1 is a diagram of a client-server system that includes a polymorphic worm blocking application executing on a host computer system in accordance with one embodiment of the present invention.

More particularly, FIG. 1 is a diagram of a client-server system 100 that includes a polymorphic worm blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, polymorphic worm blocking application 106 is loaded into host computer system 102 via I/O device 123, such as from a CD, DVD or floppy disk containing polymorphic worm blocking application 106.

In one embodiment, memory 114 includes a virtual memory system that maps virtual addresses located in the virtual memory address space to code and/or data located in physical memory. For example, the virtual memory system is a page based virtual memory system that uses pages, e.g., 4096 byte memory areas. These pages have individual properties such as, for example, that they are mapped or unmapped from a file stored in physical memory. For example, a set of flags describe the properties of a page. Virtual memory systems and mapping of pages from files in physical memory are well known to those of skill in the art and so are only discussed briefly-to avoid detracting from the principles of the invention.

Host computer system 102 is coupled to a server system 130, e.g., a SMTP (Simple Mail Transfer Protocol) server, of client-server system 100 by a network 124. Server system 130 typically includes a display device 132, a processor 134, a memory 136, and a network interface 138.

Host computer system 102 further includes a SMTP proxy 150, which emulates, sometimes called mimics, a SMTP server, e.g., server system 130. In various embodiments, SMTP proxy 150 is part of or separate from polymorphic worm blocking application 106.

SMTP proxy 150 sits between SMTP client applications of host computer system 102 and the SMTP server, e.g., server system 130. Accordingly, instead of a SMTP client application of host computer system 102 directly establishing a connection with the SMTP server, the SMTP client application establishes a connection to SMTP proxy 150. Further, instead of a SMTP client application of host computer system 102 directly sending information, e.g., an e-mail message, to the SMTP server, the information from the SMTP client application is sent to SMTP proxy 150, which, in turn, sends the information to the SMTP server. SMTP proxies are well known to those of skill in the art and so are only briefly discussed to avoid detracting from the principles of the invention.

In one embodiment, SMTP proxy 150 includes a redirector for intercepting e-mail messages, a scan manager containing intelligence for examining the contents of e-mails, a decomposer for unpacking objects, an Application Programming Interface (API) such as Norton Antivirus Application Programming Interface (NAVAPI) for providing scan manager with ready access to conventional antivirus software and extensions such as Norton Antivirus Extensions (NAVEX) which contain all of the scanning engines, virus signatures, and virus names used in conventional antivirus scanning as described in Szor, commonly assigned U.S. patent application Ser. No. 10/255,658, filed on Sep. 25, 2002, entitled "PREVENTING E-MAIL PROPAGATION OF MALICIOUS COMPUTER CODE", which is herein incorporated by reference in its entirety.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principles of the invention.

Network 124 can be any network or network system that is of interest to a user. In various embodiments, network interface 138 and I/O interface 110 include analog modems, digital modems, or a network interface card.

Polymorphic worm blocking application 106 is stored in memory 114 of host computer system 102 and executed on host computer system 102. The particular type of and configuration of host computer system 102, hacker computer system 104, and server system 130 are not essential to this embodiment of the present invention.

FIG. 2 is a flow diagram of a host computer process 200 in accordance with one embodiment of the present invention. Referring now to FIGS. 1 and 2 together, execution of polymorphic worm blocking application 106 by processor 108 results in the operations of host computer process 200 as described below in one embodiment.

From an enter operation 202, flow moves to an establish SMTP proxy operation 204. In establish SMTP proxy operation 204, SMTP proxy 150 is established. SMTP proxy 150 is discussed above, the discussion of which is incorporated herein by reference in its entirety.

From establish SMTP proxy operation 204, flow moves to a SMTP client application connects to proxy operation 206. In SMTP client application connects to proxy operation 206, a SMTP client application forms a connection to SMTP proxy 150.

In one embodiment, an application that has the capability to form a connection with a SMTP server is a SMTP client application. In one specific embodiment, any application that forms a connection with SMTP proxy 150 is a SMTP client application, i.e., is defined as a SMTP client application. In accordance with this embodiment, the applications of host computer system 102 are not analyzed to determine if the applications are SMTP client applications, simply any application that forms a connection with SMTP proxy 150 is defined as and is a SMTP client application because of the application's demonstrated ability to form the connection.

SMTP client applications are non-malicious or malicious. For example, a SMTP client application is malicious if the SMTP client application is polymorphic malicious code such as a polymorphic SMTP mass mailing worm. In one embodiment, malicious code is defined as any computer program, module, set of modules, or code that enters a computer system without an authorized user's knowledge and/or without an authorized user's consent. Polymorphic malicious code is malicious code that changes its encryption and thus virus signature (i.e., binary pattern) every time it replicates but whose virus signature is identical or nearly identical when decrypted.

From SMTP client application connects to proxy operation 206, flow moves to an emulate SMTP client application operation 208. In emulate SMTP client application operation 208, the SMTP client application which formed a connection with SMTP proxy 150 in operation 206 is emulated. In one embodiment, the emulation is performed multiple times from various entry points such as the header in the case when the SMTP client application is a portable executable file. Emulation is well known to those of skill in the art and the particular emulator and emulation technique used are not essential to the present invention.

In one embodiment, an application is emulated by allowing the application, or a copy of the application, to run in a virtual machine. In accordance with this embodiment, the file image of the SMTP client application is mapped, sometimes called loaded, into the virtual memory, and more specifically, in the pages of the virtual memory, of the virtual machine. The SMTP client application is executed in the virtual machine.

After execution of the SMTP client application in the virtual machine, a determination is made as to whether any of the pages in which the file image of the SMTP client application was loaded changed, e.g., was partially or totally rewritten, modified, and/or deleted, during execution of the SMTP client application. If any of the pages did change, the page is marked as a dirty page, e.g., with a flag. More particularly, a dirty page is a page of virtual memory that changes during execution of the application being emulated, which is the SMTP client application in this embodiment.

In one particular embodiment, the SMTP client application is decrypted in emulate SMTP client application operation 208 as discussed above.

From emulate SMTP client application operation 208, flow moves to a dirty pages generated check operation 210. In dirty pages generated check operation 210, a determination is made as to whether any dirty pages, i.e., at least one dirty page, were generated during emulation of the SMTP client application. These dirty pages are sometimes referred to as SMTP client application dirty pages.

Illustratively, a SMTP client application that decrypts itself during execution generates dirty pages. For example, when the SMTP client application is a polymorphic SMTP mass mailing worm, i.e., polymorphic malicious code, dirty pages are generated during emulation (execution) of the SMTP client application. Conversely, if dirty pages are not generated during execution of the SMTP client application, the SMTP client application is not polymorphic malicious code.

Accordingly, if a determination is made that dirty pages are not generated during dirty pages generated check operation 210, flow moves to an exclude SMTP client application as a polymorphic SMTP mass mailing worm operation 212. In exclude SMTP client application as a polymorphic SMTP mass mailing worm operation 212, the SMTP client application is excluded as being polymorphic malicious code, e.g., a polymorphic SMTP mass mailing worm. Once excluded, no further processing by polymorphic worm blocking application 106 with respect to the SMTP client application or data from the SMTP client application is taken as discussed in more detail with respect to check operation 308 of FIG. 3. In one embodiment, the SMTP client application is added to a polymorphic SMTP mass mailing worm exclusion list during operation 212.

From operation 212, flow moves to and exits at exit operation 214 or moves to an enter operation 302 of FIG. 3.

Returning again to dirty pages generated check operation 210, if a determination is made that dirty pages are generated, flow moves from dirty pages generated check operation 210 to a save state of SMTP client application operation 216. In save state of SMTP client application operation 216, the state of the SMTP client application is saved, e.g., to a file. The state of the SMTP client application includes a listing, e.g., the addresses, of the dirty pages generated as well as the content of the dirty pages. Further, the state of the SMTP client application further includes the conditions under which the SMTP client application was emulated as well as any other characteristics of the SMTP client application or emulation of interest.

From save state of SMTP client application operation 216, flow moves to and exits at exit operation 214 or moves to enter operation 302 of FIG. 3.

FIG. 3 is a flow diagram of a host computer process 300 in accordance with one embodiment of the present invention. Referring now to FIGS. 1 and 3 together, execution of polymorphic worm blocking application 106 by processor 108 results in the operations of host computer process 300 as described below in one embodiment.

From enter operation 302, flow moves to a SMTP client application sends data operation 304. In SMTP client application sends data operation 304, a SMTP client application sends data, e.g., an e-mail message with an attachment, e.g., a portable executable file attachment. The SMTP client application sends the data to SMTP proxy 150, although to the SMTP client application, the data is being sent to a SMTP server, i.e., the SMTP client application thinks that the data is being sent to a SMTP server. As discussed above, SMTP proxy 150 mimics the SMTP server.

From SMTP client application sends data operation 304, flow moves to a stall data operation 306. In stall data operation 306, the data from the SMTP client application is stalled. In one embodiment, the data is intercepted by SMTP proxy 150 and held by SMTP proxy 150 and stalled in stall data operation 306.

From stall data operation 306, flow moves to a SMTP client application excluded check operation 308. In SMTP client application excluded check operation 308, a determination is made as to whether the SMTP client application is excluded. As discussed above, a SMTP client application is excluded during exclude SMTP client application as a polymorphic SMTP mass mailing worm operation 212 of FIG. 2. Accordingly, if dirty pages were not generated during emulation of the SMTP client application during host computer process 200, a determination is made in SMTP client application excluded check operation 308 that the SMTP client application is excluded.

If a determination is made in SMTP client application excluded check operation 308 that the SMTP client application is excluded, flow moves to an allow data to proceed operation 310. In allow data to proceed operation 310, the data is allowed to proceed, e.g., the data is released from SMTP proxy 150 and/or released to further processing. Flow moves from allow data to proceed operation 310 to an exit operation 312 or returns to operation 304.

In this event, dirty pages were not generated during emulation of the SMTP client application during host computer process 200. Thus, as discussed above, the SMTP client application is not polymorphic malicious code. As a result, processing of data from the SMTP client application to determine if the SMTP client application is polymorphic malicious code is unnecessary and thus not performed. In this manner, the impact of polymorphic worm blocking application 106 on the performance of host computer system 102 is minimized.

Conversely, if a determination is made in SMTP client application excluded check operation 308 that the SMTP client application is not excluded, flow moves to a decompose data operation 314. In decompose data operation 314, the data from the SMTP client application is decomposed, if necessary. In one embodiment, the data is encoded using the ASCII characters set and the data is decomposed, sometimes decoded, into a binary character set in decompose data operation 314. In another embodiment, the data is unpacked, e.g., unzipped, in decompose data operation 314.

From decompose data operation 314, flow moves to an executable content check operation 316. In executable content check operation 316, a determination is made as to whether the data, which has now been decomposed, from the SMTP client application includes executable content. If the data includes polymorphic malicious code such as a polymorphic SMTP mass mailing worm, the data will include executable content.

If a determination is made in executable content check operation 316 that the data does not include executable content, flow moves to allow data to proceed operation 310. In allow data to proceed operation 310, the data is allowed to proceed, e.g., the data is released from SMTP proxy 150 and/or released to further processing. In this event, the data is not polymorphic malicious code. As a result, further processing of the data from the SMTP client application is unnecessary and thus not performed. In this manner, the impact of polymorphic worm blocking application 106 on the performance of host computer system 102 is minimized.

To preserve and prevent corruption of the data, in one embodiment, the original data from the SMTP client application is held by SMTP proxy 150. A copy of the data is decomposed in decompose data operation 314 and further process by host computer process 300. In allow data to proceed operation 310, the original data is allowed to proceed, e.g., the original data is released from SMTP proxy 150 and/or released to further processing. The copy of the data, which has been decomposed in decompose data operation 314, is discarded. Accordingly, as used herein, the term "data" refers to the original data from the SMTP client application as well as copies of the original data from the SMTP client application including decomposed copies of the original data from the SMTP client application.

Conversely, if a determination is made in executable content check operation 316 that the data does include executable content, flow moves to an emulate executable operation 318. In one embodiment, executable content is generally an executable application. For example, executable content is a portable executable file or a plurality of portable executable files.

In emulate executable operation 318, the executable application of the data is emulated if the data contains only a single executable application or a first executable application of the data is emulated if the data contains a plurality of executables applications. In one embodiment, the emulation is performed multiple times from various entry points such as the header in the case when the executable application is a portable executable file. Emulation is well known to those of skill in the art and the particular emulator and emulation technique used are not essential to the present invention.

In one embodiment, an executable application is emulated by allowing the executable application, or a copy of the executable application, to run in a virtual machine under the same conditions as the SMTP client application was emulated in emulate SMTP client application operation 208. Recall that the conditions under which the SMTP client application was emulated were saved in save state of SMTP client application operation 216.

More particularly, the file image of the executable application is mapped, sometimes called loaded, into the virtual memory, and more specifically, into the pages of the virtual memory, of the virtual machine. The executable application is executed in the virtual machine under the same conditions as the SMTP client application was executed in emulate SMTP client application operation 208.

After execution of the executable application in the virtual machine, a determination is made as whether any of the pages in which the file image of the executable application was loaded changed, e.g., was partially or totally rewritten, modified, and/or deleted, during execution of the executable application. If any of the pages did change, the page is marked as a dirty page, e.g., with a flag and optionally saved. More particularly, a dirty page is a page of virtual memory that changes during execution of the executable application being emulated.

In one particular embodiment, the executable application is decrypted in emulate executable operation 318 as discussed above.

From emulate executable operation 318, flow moves to a dirty pages generated check operation 320. In dirty pages generated check operation 320, a determination is made as to whether any dirty pages, i.e., at least one dirty page, were generated during emulation of the executable application. These dirty pages are sometimes called executable application dirty pages.

Illustratively, an executable application that decrypts itself during execution generates dirty pages. For example, when the executable application is a polymorphic SMTP mass mailing worm, i.e., polymorphic malicious code, dirty pages are generated during emulation (execution) of the executable application. Conversely, if dirty pages are not generated during execution of the executable application, the executable application is not polymorphic malicious code.

If a determination is made that dirty pages are not generated, flow moves from dirty pages generated check operation 320 to a last executable check operation 330, which is discussed further below. Conversely, if a determination is made that dirty pages are generated, flow moves from dirty pages generated check operation 320 to a dirty pages from executable and SMTP client application same check operation 322. In dirty pages from executable and SMTP client application same check operation 322, a determination is made as to whether the dirty pages from the executable application and SMTP client application are the same, sometimes called a match. Illustratively, dirty pages of the SMTP client application and the executable application that have the same virtual memory offset, i.e., address, are compared.

In one embodiment, by determining whether the dirty pages from the executable application and SMTP client application are the same in check operation 322, a determination is made as to whether the SMTP client application when decrypted is the same as the executable application when decrypted.

In one embodiment, the content of the dirty page or pages of the SMTP client application is compared with the content of the dirty page or pages of the executable application to determine whether the dirty pages from the executable application and SMTP client application are the same. This comparison is done using any one of a number of techniques.

For example, the comparison is done by comparing the bytes of the content of the dirty page or pages of the SMTP client application with the bytes of the content of the dirty page or pages of the executable application, e.g., a byte-to-byte comparison. If the bytes of the content of the dirty page or pages of the SMTP client application exactly match the bytes of the content of the dirty page or pages of the executable application, a determination is made that the dirty pages from the executable application and SMTP client application are the same.

As another example, the comparison is done by comparing the hash of the content of the dirty page or pages of the SMTP client application with the hash of the content of the dirty page or pages of the executable application, e.g., a hash-to-hash comparison. If the hash of the content of the dirty page or pages of the SMTP client application exactly match the hash of the content of the dirty page or pages of the executable application, a determination is made that the dirty pages from the executable application and SMTP client application are the same.

To allow a greater range of detection, in one embodiment, a certain amount of mismatch between the dirty pages from the executable application and SMTP client application are allowed (the dirty pages are nearly but not exactly identical) while still resulting in a determination that the dirty pages from the executable application and SMTP client application are the same. In one embodiment, for a byte-to-byte comparison, up to 512 bytes of difference are allowed between the content of each dirty page of the SMTP client application and the content of the corresponding dirty page of the executable application, where each page is about 4 KB of information.

If a determination is made that the dirty pages from the executable application and SMTP client application are not the same in check operation 322, flow moves to last executable check operation 330, which is discussed further below. Conversely, if a determination is made that the dirty pages from the executable application and SMTP client application are the same in check operation 322, flow moves, optionally, to a known false positive check operation 324 (or directly to a take protective action operation 326 if known false positive check operation 324 is not performed).

In known false positive check operation 324, a determination is made as to whether the match between the dirty pages from the executable application and the SMTP client application is a known false positive. A known false positive is when a nonmalicious executable application, i.e., an executable application that is not associated with malicious code, generates dirty pages that are the same as the dirty pages of a nonmalicious SMTP client application, i.e., a SMTP client application that is not associated with malicious code. Illustratively, a user-defined or downloadable exclusion and/or inclusion list is used to determine whether the dirty page match is a known false positive.

If a determination is made in check operation 324 that the dirty page match is a known false positive, flow moves to last executable operation 330, which is performed as discussed below. Conversely, if a determination is made in check operation 324 that the dirty page match is not a known false positive, flow moves to a take protective action operation 326.

In take protective action operation 326, protective action is taken to prevent the malicious code of the SMTP client application and the data from the SMTP client application from causing damage to or exploiting host computer system 102 and/or from replicating to other computer systems. For example, the SMTP client application and the data are terminated. More particularly, the data from the SMTP client application is not forwarded to its destination but terminated thus preventing the malicious code within the data from spreading to other computer systems.

In one embodiment, the user of host computer system 102 is given a set of choices on the protective action to be taken in take protective action operation operation 326 (or whether no protective action is to be taken).

Polymorphic malicious code, e.g., a polymorphic worm such as a polymorphic SMTP mass mailing worm, has a file image, which is the encrypted content of the polymorphic worm as a file and prior to execution. Further, polymorphic malicious code changes its encryption upon replication. Accordingly, the file image of the polymorphic malicious code is different for each replication. Stated another way, the file image of polymorphic malicious code, e.g., a malicious SMTP client application, is different than the file image of the replicated polymorphic malicious code, e.g., the data from the SMTP client application.

However, upon execution of polymorphic malicious code, the polymorphic malicious code decrypts itself. Once decrypted, polymorphic malicious code and each replication of the polymorphic malicious code is exactly or nearly identical, i.e., is a match.

More particularly, the file image of the encrypted polymorphic malicious code is mapped to pages of the virtual memory as the polymorphic malicious code is loaded. As the polymorphic malicious code is executed, one or more of the pages of the virtual memory change as the polymorphic malicious code decrypts itself. Once decrypted, the content of these dirty pages for the polymorphic malicious code and each replication of the polymorphic malicious code are exactly or nearly identical.

Thus, because a determination is made in check operation 322 that the dirty pages from the executable application and the SMTP client application are the same, it is likely that the SMTP client application is sending a copy of itself. Because nonmalicious code rarely if ever sends a copy of itself, the likelihood that the SMTP client application and the executable application are malicious code is significant. Further, unknown polymorphic malicious code, i.e., polymorphic malicious code which does not have a known virus signature, is readily detected in accordance with the present invention.

For example, the SMTP client application is polymorphic malicious code such as a polymorphic SMTP mass mailing worm and the executable application is a replication of the polymorphic SMTP mass mailing worm, which is being spread by e-mail. However, by terminating instead of sending the executable application, the spread of the polymorphic malicious code, e.g., the W32.Bugbear.B or W32.Dukstenworm, is prevented.

Figure 4:
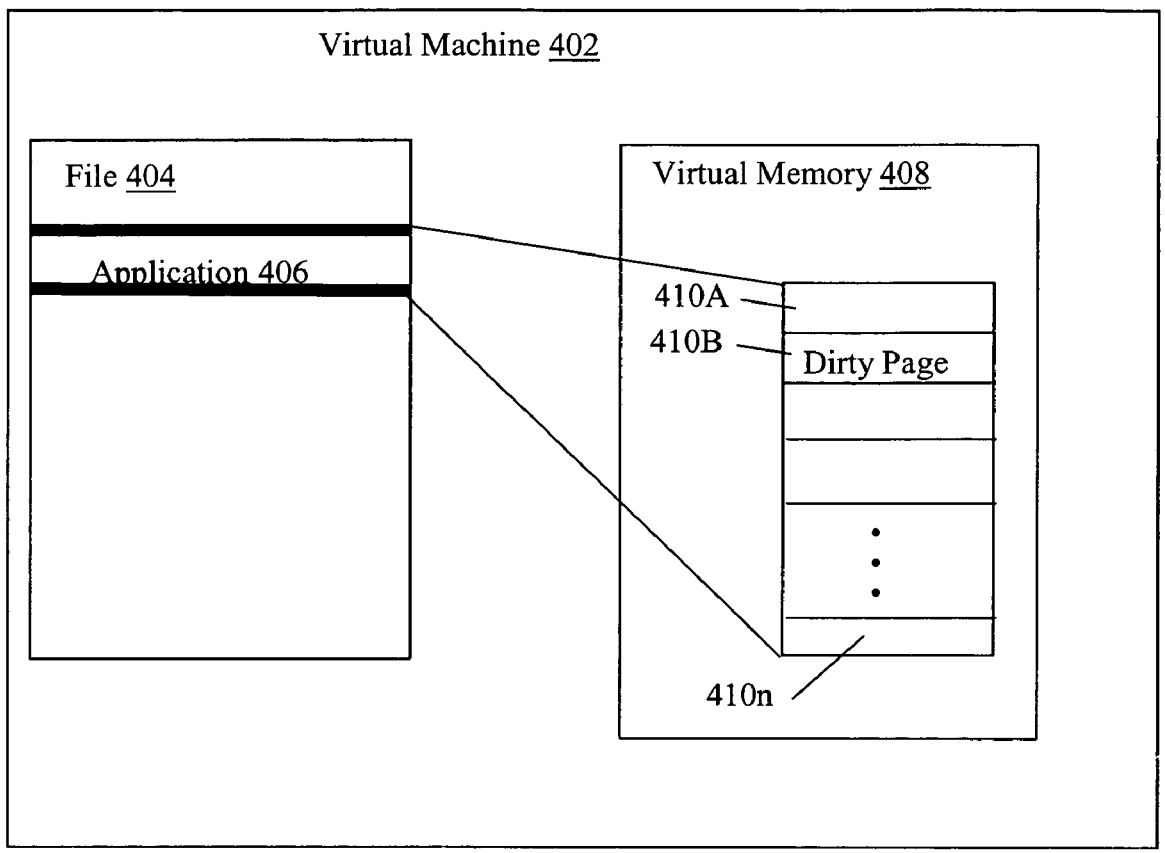
FIG. 4 is a block diagram of a virtual machine emulating a file comprising an application in accordance with one embodiment of the present invention.

To illustrate, FIG. 4 is a block diagram of a virtual machine 402 emulating a file 404 comprising an application 406 in accordance with one embodiment of the present invention. Initially, application 406 is mapped, sometimes called loaded, into a virtual memory 408 of virtual machine 402. Virtual memory 408 includes pages 410A, 410B, . . . , 410n.

Application 406 is executed and the content of page 410B changes. Accordingly, page 410B is a dirty page.

FIG. 5 is a pseudocode representation of a dirty page 410B-1 before and after execution of a polymorphic malicious SMTP client application, i.e., polymorphic malicious code, in accordance with one embodiment of the present invention. Referring now to FIGS. 2 and 5 together, the polymorphic malicious SMTP client application is emulated in emulate SMTP client application operation 208. During this emulation, the initial content of dirty page 410B-1, e.g., located at virtual memory offset 00401000, is the file image FI1 of the portion of the polymorphic malicious SMTP client application loaded into dirty page 410B-1. During execution of the polymorphic malicious SMTP client application during emulation, the content of dirty page 410B-1 changes to an emulated image EI1, sometimes called the decrypted file image of the polymorphic malicious SMTP client application.

Accordingly, in dirty pages generated check operation 210, a determination is made that at least one dirty page was generated during emulation of the SMTP client application, i.e., at least dirty page 410B-1. Accordingly, the emulated image EI1 and virtual memory offset 00401000 of dirty page 410B-1 is saved in save state of SMTP client application operation 216.

FIG. 6 is a pseudocode representation of a dirty page 410B-2 before and after execution of a polymorphic malicious executable application, i.e., polymorphic malicious code, sent from the polymorphic malicious SMTP client application of FIG. 5 in accordance with one embodiment of the present invention. Referring now to FIGS. 3 and 6 together, the polymorphic malicious executable application is emulated in emulate executable operation 318. During this emulation, the initial content of dirty page 410B-2, e.g., located at virtual memory offset 00401000, is the file image FI2 of the portion of the polymorphic malicious executable application loaded into dirty page 410B-1. During execution of the polymorphic malicious executable application during emulation, the content of dirty page 410B-2 changes to an emulated image EI2, sometimes called the decrypted file image of the polymorphic malicious executable application.

Accordingly, in dirty pages generated check operation 320, a determination is made that at least one dirty page was generated during emulation of the executable application, i.e., at least dirty page 410B-2. Accordingly, referring now to FIGS. 3, 5 and 6 together, in dirty pages from executable and SMTP client application same check operation 322, the content of dirty page 410B-1 of the polymorphic malicious SMTP client application is compared to the content of dirty page 410B-2 of the polymorphic malicious executable application. Dirty pages 410B-1 and dirty page 410B-2 have the same virtual memory offset 00401000.

More particularly, emulated image EI1 of the polymorphic malicious SMTP client application is compared to emulated image EI2 of the polymorphic malicious executable application and determined to be the same. Thus, after a negative determination in known false positive check operation 324, protective action is taken in take protective action operation 326.

In contrast, file image FI1 of the polymorphic malicious SMTP client application is different than file image FI2 of the polymorphic malicious executable application due to the polymorphic engine of the polymorphic malicious code, i.e., due to the difference in encryption of the polymorphic malicious SMTP client application and the polymorphic malicious executable application. Accordingly, if the code of the polymorphic malicious executable application was compared to the code of the polymorphic malicious SMTP client application to determine if the polymorphic malicious SMTP client application is sending a copy of itself, a determination would incorrectly be made that the polymorphic malicious SMTP client application was not sending a copy of itself due to the difference in encryption of the polymorphic malicious SMTP client application and the polymorphic malicious executable application.

However, in accordance with one embodiment of the present invention, by emulating the polymorphic malicious SMTP client application and the polymorphic malicious executable application as discussed above, the polymorphic malicious SMTP client application and the polymorphic malicious executable application decrypt and expose themselves allowing a correct determination that the polymorphic malicious SMTP client application is sending a copy of itself and thus is malicious code.

Referring again to FIG. 3, flow moves from take protective action operation 326, optionally, to a notify host computer system user/administrator operation 328 (or directly to exit operation 312 if operation 328 is not performed). In notify host computer system user/administrator operation 328, the user of host computer system 102 and/or the administrator are notified that protective action has been taken on host computer system 102, e.g., that a SMTP client application and/or data from the SMTP client application have been terminated. The user and/or administrator can be notified using any one of a number of techniques, e.g., by using a pop up window, by writing to a file and/or otherwise by logging the event. Further, a notification or sample of the malicious code can be provided to a security center.

From notify host computer system user/administrator operation 328, flow moves to and exits at exit operation 312 or returns to operation 304.

As discussed above, flow moves to last executable check operation 330 if a determination is made: (1) that dirty pages were not generated in check operation 320; (2) that the dirty pages of the executable application and the SMTP client application are not the same in check operation 322; or (3) that the dirty page match is a known false positive in check operation 324. In last executable check operation 330, a determination is made as to whether the data from the SMTP client application includes any executable applications that have not been emulated.

If the data from the SMTP client application includes any executable applications that have not been emulated, flow, moves from last executable check operation 330 to a select next executable operation 332. Conversely, if the data from the SMTP client application does not include any executable applications that have not been emulated, flow moves from last executable check operation 330 to allow data to proceed operation 310, which is performed as discussed above.

In one embodiment, the data includes only a single executable application, which was emulated in emulate executable operation 318 as discussed above. In accordance with this embodiment, a determination is made in last executable check operation 330 that the data does not include any executable applications that have not been emulated and flow moves to allow data to proceed operation 310.

In another embodiment, the data includes more than one executable application. In accordance with this embodiment, a first executable application of the data was emulated in emulate executable operation 318 as discussed above but at least a second executable application of the data has not been emulated. Thus, a determination is made in last executable check operation 330 that the data does include an executable application that has not been emulated and flow moves to select next executable operation 332.

In select next executable operation 332, the next executable application of the data is selected for emulation. Flow moves from select next executable operation 332 to emulate executable operation 318. In emulate executable operation 318, the executable application selected in select next executable operation 332 is emulated as discussed above. Check operations 320, 322, 324 or a combination thereof are performed for the executable application selected in select next executable operation 332.

Operations 330, 332, 318 and check operations 320, 322, 324 or a combination thereof are performed for each executable application until all executable applications of the data from the SMTP client application have been emulated and flow moves to allow data to proceed operation 310 or until flow moves to take protective action operation 326.

In one embodiment, host computer process 300 is allowed only a certain amount of time, e.g., two minutes, within which to either take protective action in take protective action operation 326 or allow the data to proceed in allow data to proceed operation 310. In the event that the emulation of the executable application(s) or other operations of host computer process 300 exceed the allowed amount of time, i.e., host computer process 300 times out, the data is allowed to proceed in a manner similar to that discussed above in regards to allow data to proceed operation 310.

Referring again to FIG. 1, polymorphic worm blocking application 106 is in computer memory 114. As used herein, a computer memory refers to a volatile memory, a non-volatile memory, or a combination of the two.

Although polymorphic worm blocking application 106 is referred to as an application, this is illustrative only. Polymorphic worm blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, polymorphic worm blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the polymorphic worm blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the polymorphic worm blocking functionality in accordance with one embodiment of the present invention can be implemented in a wide variety of computer system configurations. In addition, the polymorphic worm blocking functionality could be stored as different modules in memories of different devices. For example, polymorphic worm blocking application 106 could initially be stored in server system 130, and then as necessary, a portion of polymorphic worm blocking application 106 could be transferred to host computer system 102 and executed on host computer system 102. Consequently, part of the polymorphic worm blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, polymorphic worm blocking application 106 is stored in memory 136 of server system 130. Polymorphic worm blocking application 106 is transferred over network 124 to memory 114 in host computer system 102. In this embodiment, network interface 138 and I/O interface 110 would include analog modems, digital modems, or a network interface card. If modems are used, network 124 includes a communications network, and polymorphic worm blocking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
    establishing a SMTP proxy;
    defining an application that forms a connection with said SMTP proxy as a SMTP client application;
    decrypting said SMTP client application;
    intercepting an executable application sent from said SMTP client application with said SMTP proxy;
    decrypting said executable application; and
    determining whether said SMTP client application when decrypted is the same as said executable application when decrypted.

2. The method of claim 1 wherein:
    said decrypting said SMTP client application comprises emulating said SMTP client application comprising generating at least one SMTP client application dirty page;
    said decrypting said executable application comprises emulating said executable application sent from said SMTP client application comprising generating at least one executable application dirty page; and said determining whether said SMTP client application when decrypted is the same as said executable application when decrypted comprises determining whether said at least one SMTP client application dirty page is a match of said at least one executable application dirty page.

3. The method of claim 2 further comprising determining whether SMTP client application dirty pages were generated during said emulating a SMTP client application, said SMTP client application dirty pages comprising said at least one SMTP client application dirty page.

4. The method of claim 3 further comprising saving a state of said SMTP client application upon a determination that said SMTP client application dirty pages were generated during said emulating a SMTP client application.

5. The method of claim 2 wherein said SMTP client application sends data comprising said executable application, said method further comprising stalling said data, wherein upon a determination that said at least one SMTP client application dirty page is not a match of said at least one executable application dirty page, said method further comprising allowing said data to proceed.

6. The method of claim 2 wherein said SMTP client application sends data comprising said executable application, said method further comprising stalling said data, wherein upon a determination that said at least one SMTP client application dirty page is a match of said at least one executable application dirty page, said method further comprising taking protective action to protect a computer system.

7. The method of claim 6 further comprising determining that said match is not a known false positive prior to said taking protective action.

8. The method of claim 6 further comprising providing a notification of said protective action.

9. The method of claim 2 further comprising determining whether executable application dirty pages were generated during said emulating an executable application, said executable application dirty pages comprising said at least one executable application dirty page.

10. The method of claim 1 wherein said SMTP client application forms a connection with said SMTP proxy.

11. The method of claim 1 wherein said SMTP client application sends data comprising said executable application.

12. The method of claim 11 further comprising decomposing said data.

13. The method of claim 11 further comprising determining whether said data comprises executable content.

14. The method of claim 11 wherein said data is intercepted and stalled by said SMTP proxy.

15. The method of claim 11 further comprising stalling said data.

16. The method of claim 11 further comprising determining whether said data comprises executable applications that have not been emulated.

17. The method of claim 16 wherein upon a determination that said data does comprised executable applications that have not been emulated, said method further comprising selecting a next executable application for emulation.

18. The method of claim 17 further comprising emulating said next executable application.

19. The method of claim 1 wherein said SMTP client application is a polymorphic malicious code.

20. The method of claim 1 wherein:
said decrypting said SMTP client application comprises emulating SMTP client application, said method further comprising:
determining whether SMTP client application dirty pages were generated during said emulating said SMTP client application;
excluding said SMTP client application as a polymorphic malicious code upon a determination that said SMTP client application dirty pages were not generated; and
saving a state of said SMTP client application upon a determination that said SMTP client application dirty pages were generated.

21. The method of claim 20 further comprising:
stalling data from said SMTP client application;
determining whether said SMTP client application is excluded as said polymorphic malicious code; and
allowing said data to proceed upon a determination that said SMTP client application is excluded.

22. A computer program product comprising a polymorphic worm blocking application, said polymorphic worm blocking application for:
establishing a SMTP proxy;
defining an application that forms a connection with said SMTP proxy as a SMTP client application;
decrypting said SMTP client application comprising emulating said SMTP client application comprising generating at least one SMTP client application dirty page;
intercepting an executable application sent from said SMTP client application with said SMTP proxy;
decrypting said executable application comprising emulating said executable application sent from said SMTP client application comprising generating at least one executable application dirty page; and
determining whether said SMTP client application when decrypted is the same as said executable application when decrypted comprising determining whether said at least one SMTP client application dirty page is a match of said at least one executable application dirty page.

* * * * *

UNITED STATES PATENT AND TRADEMARK OFFICE
CERTIFICATE OF CORRECTION

| | | |
|---|---|---|
| PATENT NO. | : 7,334,262 B2 | Page 1 of 1 |
| APPLICATION NO. | : 10/763731 | |
| DATED | : February 19, 2008 | |
| INVENTOR(S) | : Peter Szor | |

It is certified that error appears in the above-identified patent and that said Letters Patent is hereby corrected as shown below:

In Column 16, Line 5, Claim 17, replace "comprised" with --comprise--.

Signed and Sealed this

Fourteenth Day of October, 2008

JON W. DUDAS
*Director of the United States Patent and Trademark Office*